US005628863A

United States Patent [19]

Lee

[11] Patent Number: 5,628,863

[45] Date of Patent: May 13, 1997

[54] POUCH PRODUCING MACHINE

[76] Inventor: Shu-ken Lee, 2nd Fl., No. 3, Chenglung Lane, Sec. 2, Sanmin Rd., Panchiao City, Taipei Hsien, Taiwan

[21] Appl. No.: 661,992

[22] Filed: Jun. 12, 1996

[51] Int. Cl.[6] ........................ B32B 31/00

[52] U.S. Cl. ........................ 156/353; 156/510; 156/513; 156/555; 156/578; 156/580

[58] Field of Search ........................ 156/353, 510, 156/513, 555, 578, 580, 583.1; 100/93 RP

[56] References Cited

U.S. PATENT DOCUMENTS 4,841,712 6/1989 Roou ........................ 53/412

5,266,150 11/1993 Miller ........................ 156/583.4

5,312,507 5/1994 Miller ........................ 156/290

*Primary Examiner*—James Sells

*Attorney, Agent, or Firm*—Ralph F. Crandell; Dorsey & Whitney LLP

[57] ABSTRACT

A pouch producing machine for producing protective pouches has a feeding device, a gluing device, a glue provider and a cutting-forming device. A sheet of pouch has an upper sheet, a lower sheet, a middle bar and two side bars. The already combined sheet of pouches, after being processed by the machine, becomes an individual pouch having its three sides sealed by the middle bar and the side bars.

2 Claims, 7 Drawing Sheets

POUCH PRODUCING MACHINE

FIELD OF THE INVENTION

The present invention generally relates to a pouch producing machine and more particularly to a pouch producing machine for pouches in which collectable items may be stored.

BACKGROUND OF THE INVENTION

It has been popular for many years to collect series of items, such as baseball cards, and such accumulations bring much pleasure to the collectors. However, those items are often quite flimsy and so are easily damaged when being handled. That damage is detrimental to the appearance of the card and will significantly affect the swap or financial value of the card. Thus it is desirable to store the cards in transparent pouches in which the cards may be maintained in pristine condition.

Prior art of producing pouches is cut and sealed manually which is inefficient and accordingly wastes time and mony. Furthermore, the quantity able to be produced per day is limited.

The present invention provides an improved pouch producing machine for producing card shields, such as baseball cards, to mitigate and/or obviate the aforementioned problems.

SUMMARY OF THE INVENTION

The main objective of the invention is to provide an automatic means for producing baseball card shields which automatically manufactures a baseball card shield, including the stages of feeding, gluing and cutting- The automatic means comprises a feeding device, a gluing device and a cutting-forming device. The feeding device transports raw material into the gluing device and the gluing device presses the glued sheet of material on both sides and then transports them into the next device. The cutting-forming device receives the ready-cut sheet of material and cuts the pressed material by a special cutting tool and thus products are ready to be sold on the market.

Another objective of the invention is to provide a means which manufactures pouch fully automatically, therefore reducing the expense and time consumption to a minimum.

Other objects, advantages and novel features of the invention will become more apparent from the following detailed description when taken in conjunction with the accompanying drawings.

BRIEF DESCRIPTION OF THE DRAWINGS

The present invention will now be better understood with reference of the accompanying drawings wherein.

DETAILED DESCRIPTION OF THE PREFERRED EMBODIMENT

Figure 1:
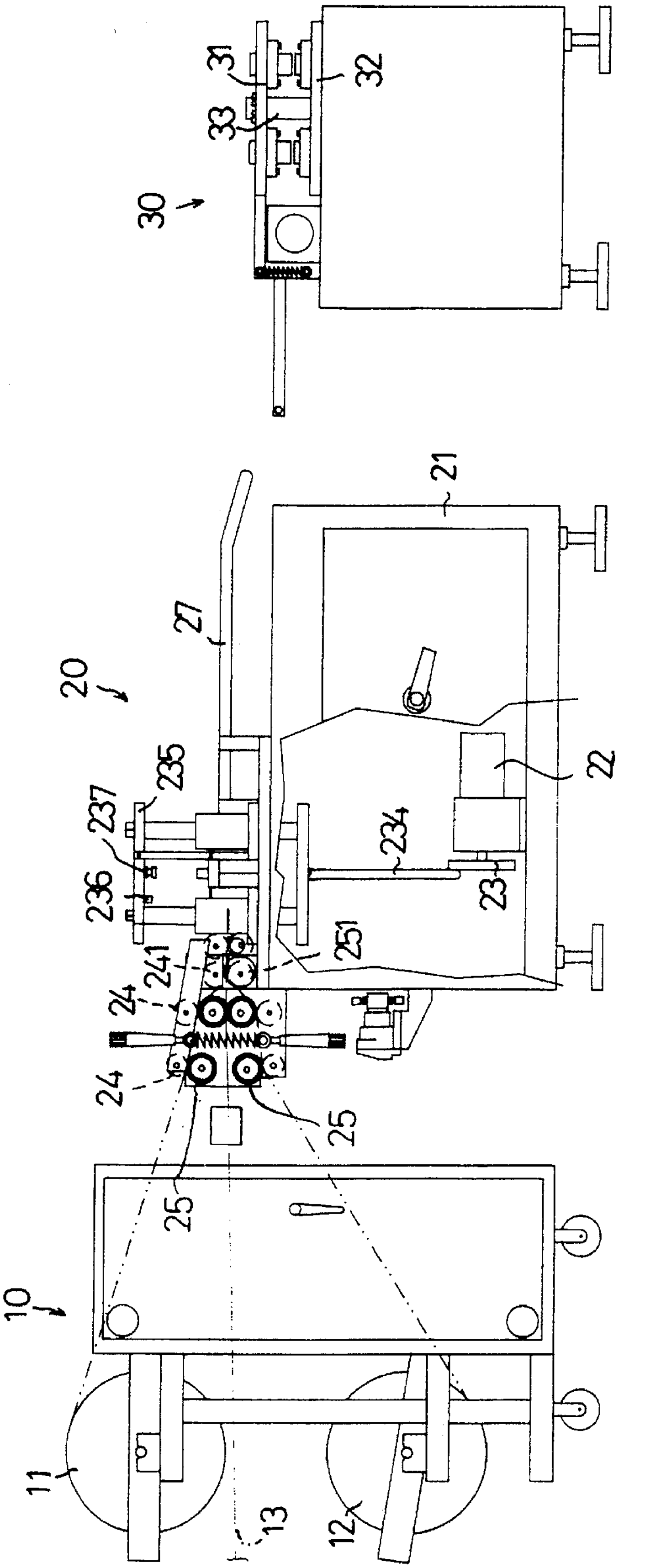
FIG. 1 is a sectional view of one preferred embodiment of the present invention.
Figure 3:
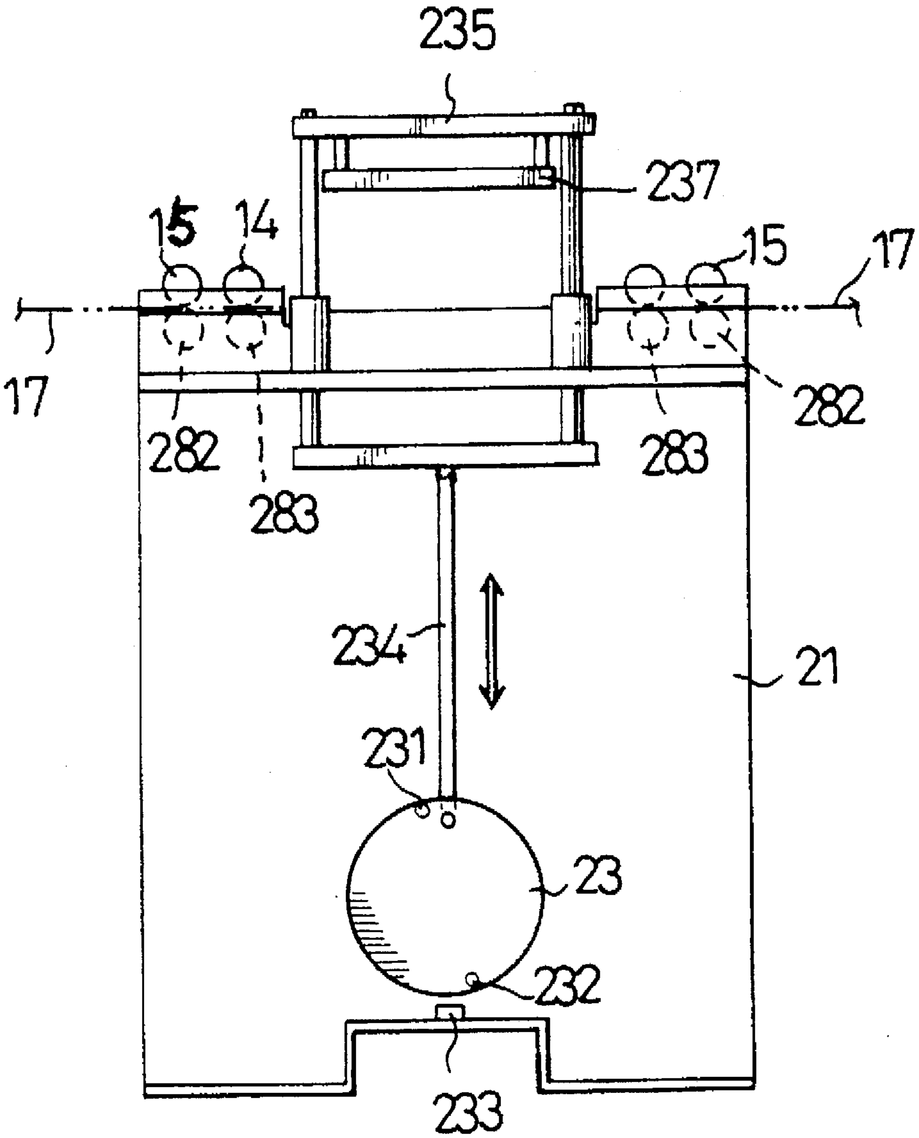
FIG. 3 is a sectional view of a gluing device of the invention.

Referring to the drawings and particularly to FIGS. 1 and 3, a machine for producing protective pouches is provided.

The machine for producing protective pouches comprises a feeding device 10, a gluing device 20 and a cutting-forming device 30. The feeding device 10 functions to transport a roll of an upper sheet 11, a roll of a lower sheet 12 and a roll of a middle bar 13 therebetween.

Figure 2:
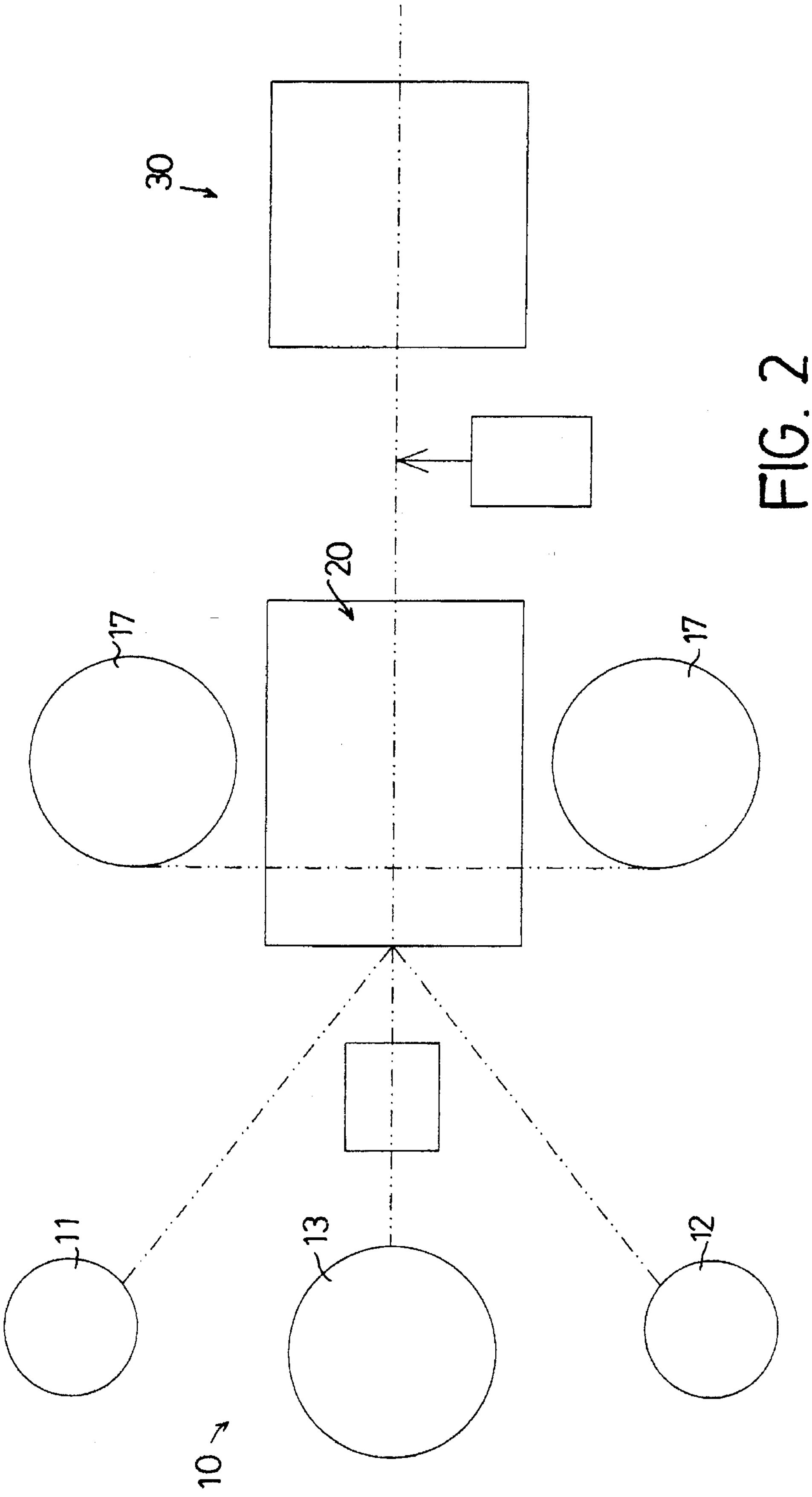
FIG. 2 is a flow chart of the invention.
Figure 4:
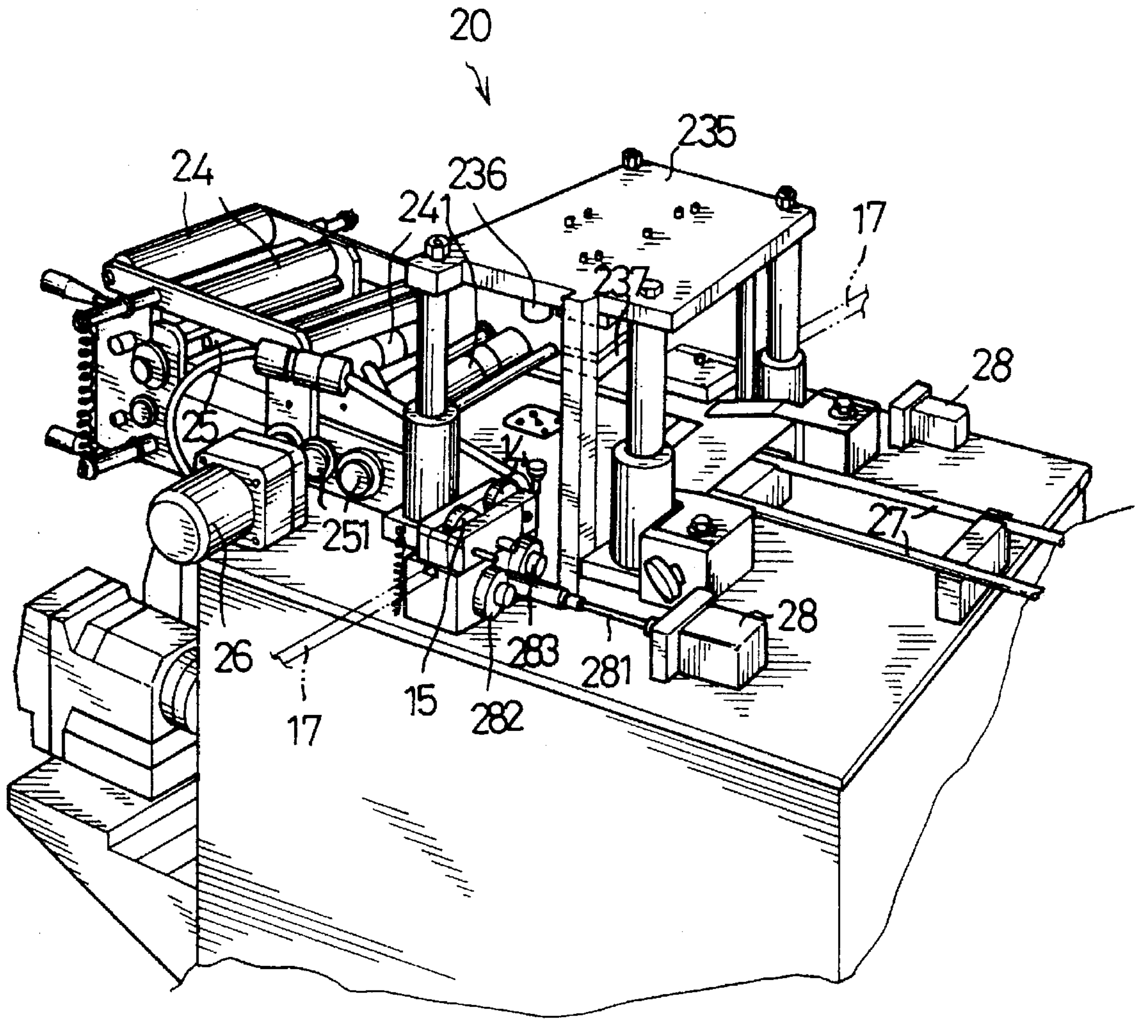
FIG. 4 is a perspective view of the gluing device.

The gluing device 20 for providing glue to the upper sheet 11, the lower sheet 12 and the middle bar 13 respectively in their proper positions has a case 21 with a first motor 22 mounted therein and forms a bottom part of the device 20. A disk 23 provided beside the first motor 22, having at least two sensors 231, 232 which are situated at opposite directions is pivotally connected with a link 234. A sensing element 233 is situated below the disk 23. The link 234 engages with an upper plate 235 having a punch 236 and a pressing plate 237. The punch 236 faces downward and is mounted on a bottom face of the upper plate 235 for punching holes in a certain part of pouches for easier cutting. Two groups of opposite transporting wheels 24, 25 are provided on a front part of the gluing device 20. Another two groups of opposite pressing wheels 241, 251 are situated behind the latter group of transporting wheels 24, 25, and the upper sheet 11, the lower sheet 12 and the middle bar 13 are able to be pressed to form a combined sheet of a pouch to be transported to a next device therebetween. A glue provider 18 is provided between the latter group of the transporting wheels 24, 25 and a front group of the pressing wheels 241, 251, as shown in FIGS. 1 and 2. The rotation of the pressing wheels 241, 251 driven by a second motor 26 transports the glued middle bar 13 and passes the middle bar 13 through the upper sheet 11 and the lower sheet 12 (as shown in FIG. 4). A track 27 provided behind the gluing device 20 is designed for the continuous forward moving of the upper sheet 11 and the lower sheet 12, and while the combined sheet of the pouches formed by pressing the middle bar 13 between the upper sheet 11 and the lower sheet 12 passes through the track 27, the combined sheet of the pouches is properly dried.

Figure 5:
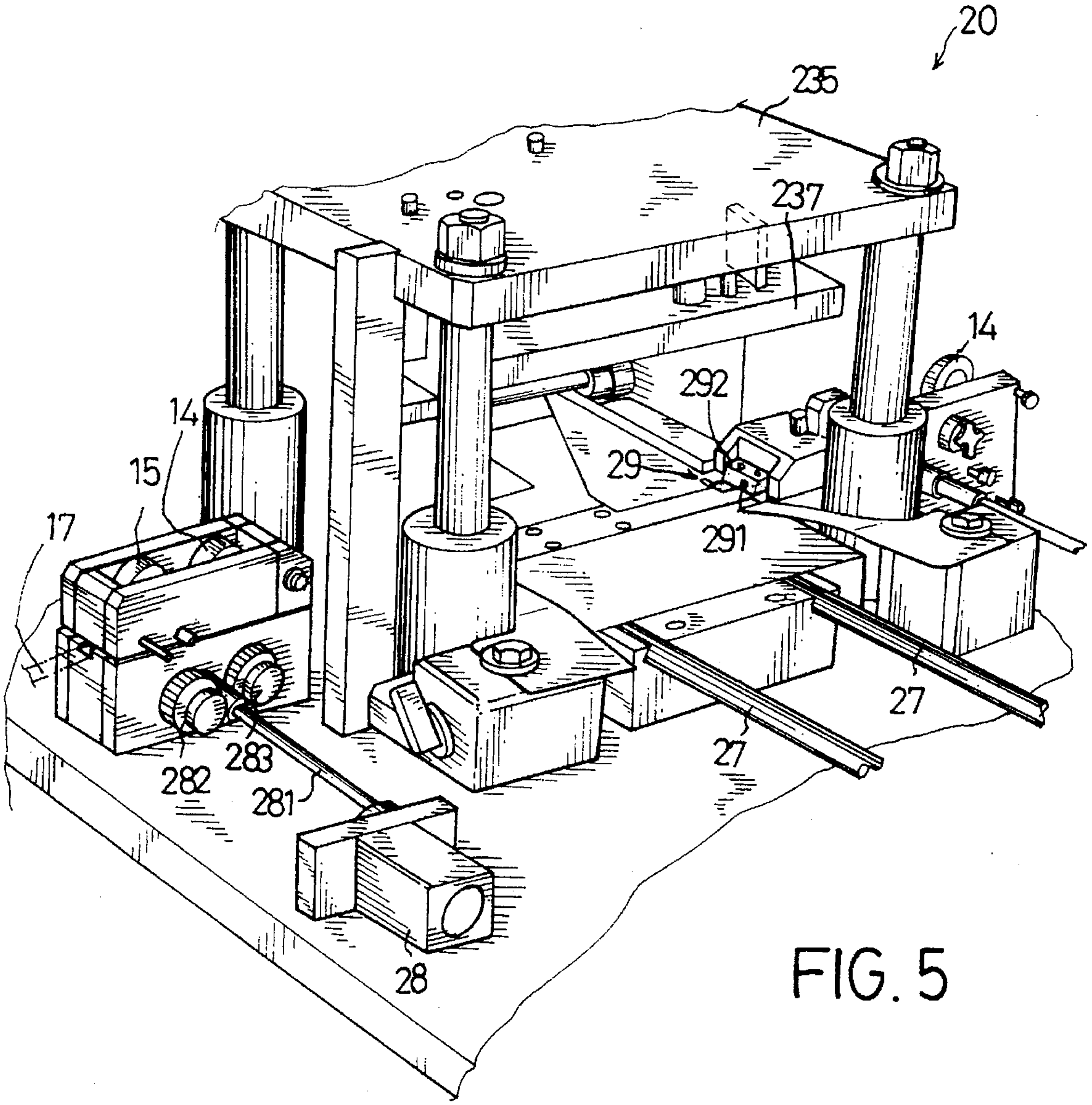
FIG. 5 is a partial enlargement of the perspective view of the gluing device of the invention.

Referring to FIG. 4, a pair of third motors 28 each provided with a shaft 281 to control a group of gears 282, 283 and lower pressing wheels (not shown) are respectively mounted on both sides of the case 21. A group of upper pressing wheels 14, 15 are mounted on top of the lower pressing wheels to allow a side bar 17 to be transported to the center of the gluing device 20 and pressed between the lower pressing wheels and the upper pressing wheels 14, 15. An opening member 29, as shown in FIG. 5, has an inclined surface 292 for opening the upper sheet 11 and the lower sheet 12, and a recess 291 permitting the side bar 17 to be transported between the upper sheet 11 and the lower sheet 12 when the upper sheet 11 and the lower sheet 12 are opened by the opening member 29.

Figure 6:
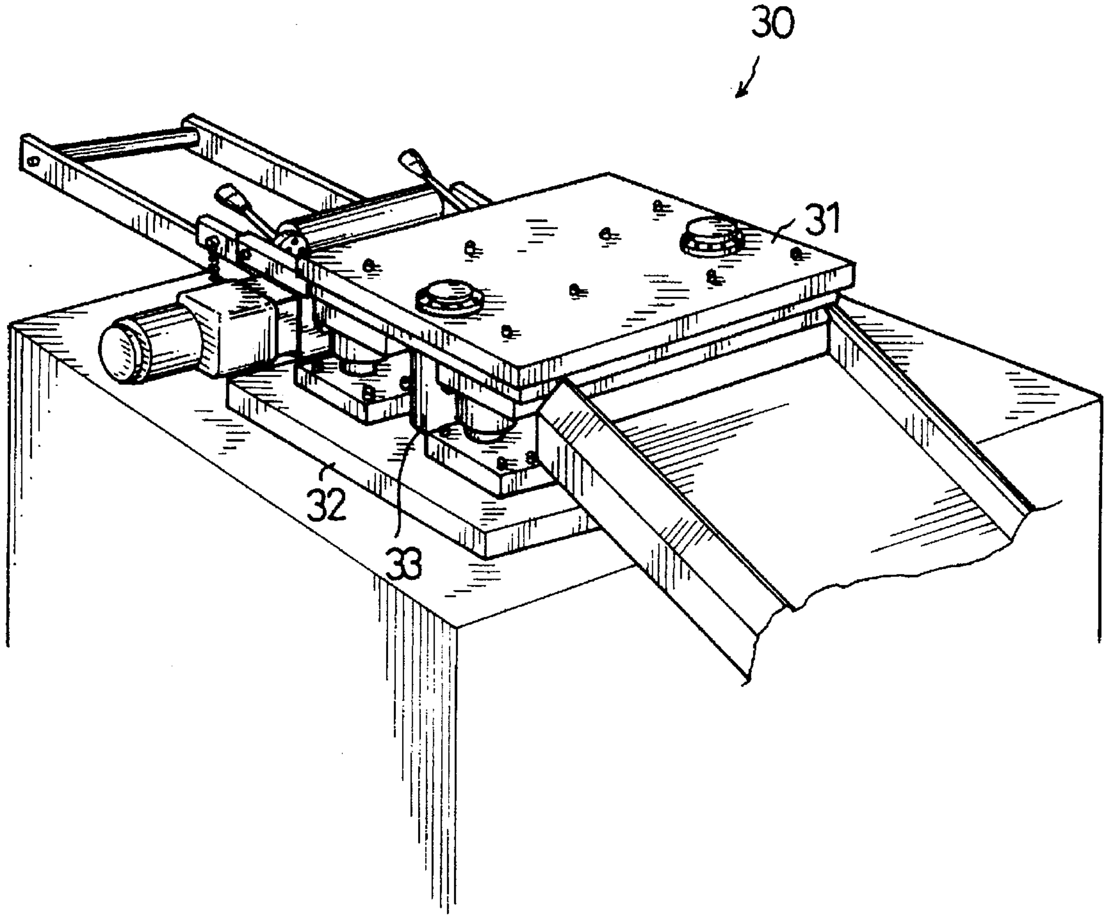
FIG. 6 is a perspective view of a cutting-forming device of the invention.

It is to be noted that when the disk 23 rotates due to the first motor 22, the sensors 231, 232 are sensed sequentially by the sensing element 233 (as shown in FIG. 3), which activates the third motor 28 to start the feeding of the side bar 17 and to position the middle bar 13 and the side bar 17 at the center and at both sides of the upper sheet 11 and the lower sheet 12 respectively. When the upper plate 235 is pulled by the link 234 due to the rotation of the first motor 22, the punch 236 provided on the bottom of the upper plate 235 will centrally punch a plurality of holes 16 in the upper sheet 11 and the lower sheet 12, the side bar 17 and the middle bar 13 will simultaneously be transported and pressed between the upper sheet 11 and the lower sheet 12. After the abovementioned procedure is finished, the upper sheet 11 and the lower sheet 12 with the middle bar 13 and the side bar 17 therebetween are then transported to the track 27 to be received by the cutting-forming device 30 (as shown in FIGS. 1 and 6).

Figure 7:
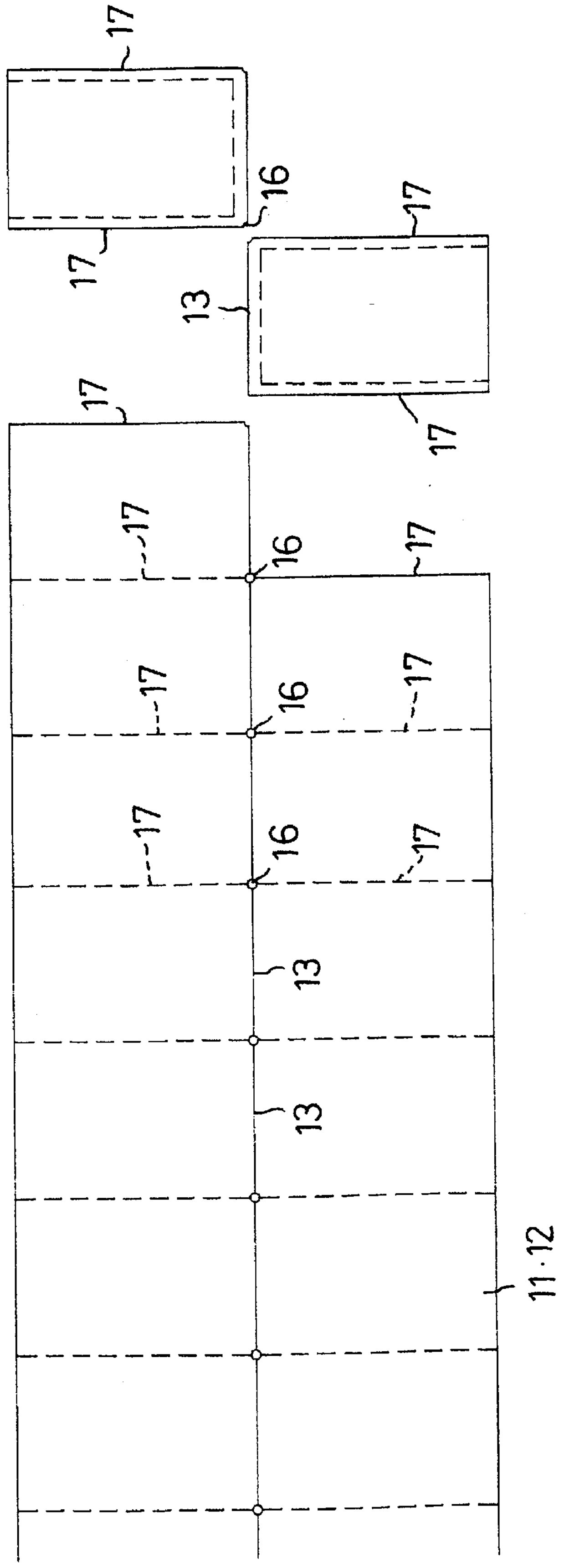
FIG. 7 is a top plan view of a semimanufactured pouch and a completed pouch constructed in accordance with the invention.

The cutting-forming device 30 comprises a cutting seat 31 driven by a powered shaft 33 and a base 32, so that the cutting seat 31 is able to be moved up and down relative to the base 32. A knife (not shown) mounted under the cutting seat 31 is subtantially configured as a "Z", therefore, pouches will be cut along one side bar 17, one middle bar 13 of a sheet of the pouches and another side bar 17 of another sheet of the pouches when the cutting seat 31 moves close to the base 32 along with the knife, as shown in FIG. 7. After all the above mentioned processes are completed, two sheets of individual baseball card shields are presented because of the centrally pounched holes 16.

From the foregoing, it is seen that the objects hereinbefore set forth may readily and efficiently be attained, and since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. A pouch producing machine for producing protective pouches comprising:

a feeding device;

a sheet for pouches shield having an upper sheet, a lower sheet, a middle bar and two side bars;

a gluing device having:

a case having a first motor mounted therein and defining a bottom surface;

a disk provided beside said first motor having at least two sensors situated thereon at opposite directions, said disk pivotally connected with a link engaging with an upper plate; said upper plate having:

a punch facing downward and mounted on a bottom face of said upper plate for punching holes;

a sensing element situated on said case and below said disk;

two groups of opposite transporting wheels provided on a front part of said device;

two groups of opposite pressing wheels situated behind one group of said transporting wheels;

a second motor mounted beside said transporting wheels for driving said pressing wheels;

a track provided behind said gluing device for continuous forward transportation; and a third motor mounted on both sides of said case and provided with a shaft to control a group of gears and lower pressing wheels;

a group of upper pressing wheels mounted on top of said lower pressing wheels to allow said side bar to be transported to a center of said gluing device and pressed between said lower pressing wheels and said upper pressing wheels;

an opening member having an inclined surface for opening said upper sheet and said lower sheet;

a glue applicator provided between said latter group of said transporting wheel and said front group of said pressing wheel; and a cutting-forming device comprising:

a cutting seat driven by a powered shaft;

a base;

a subtantially "Z" shaped knife mounted under said cutting seat; and a recess permitting said side bar to be transported therethrough.

2. The means as claimed in claim 1, wherein said opening member of said gluing device further has a recess permitting said side bar to be transported through said upper sheet and said lower sheet.

* * * * *